(12) United States Patent
Lam et al.

(10) Patent No.: US 7,315,260 B1
(45) Date of Patent: Jan. 1, 2008

(54) INTEGRATED REMOVABLE FUNCTIONAL FACEPLATE FOR PORTABLE COMPUTER SYSTEM

(75) Inventors: Lawrence Lam, San Jose, CA (US); Steven Shiozaki, Belmont, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 10/770,979

(22) Filed: Feb. 2, 2004

Related U.S. Application Data

(63) Continuation of application No. 09/844,558, filed on Apr. 27, 2001, now Pat. No. 6,747,578.

(51) Int. Cl.
*H03M 11/00* (2006.01)

(52) U.S. Cl. .................... 341/22; 340/825.69

(58) Field of Classification Search ........... 341/176; 340/825.69
See application file for complete search history.

(56) References Cited

U.S. PATENT DOCUMENTS

| | | | | |
|---|---|---|---|---|
| 4,359,222 A | * | 11/1982 | Smith et al. | 463/31 |
| 5,299,265 A | * | 3/1994 | Hayama et al. | 381/86 |
| 5,579,487 A | * | 11/1996 | Meyerson et al. | 710/100 |
| 6,573,843 B1 | * | 6/2003 | Murphy | 341/22 |
| 6,703,962 B1 | * | 3/2004 | Marics et al. | 341/176 |

* cited by examiner

*Primary Examiner*—Brian Zimmerman
*Assistant Examiner*—Hung Q Dang

(57) ABSTRACT

An integrated removable functional faceplate for a portable computer system. The removable functional faceplate employs specially located electrical contacts or pads that mate with similarly located electrical contacts mounted on the portable computer system, e.g., a personal digital assistant (PDA) or other electronic device. The electrical contacts of the functional faceplate carry signals that are responsive to the pressing of physical buttons which may be placed in any location on the functional faceplate. This allows individual faceplates to be developed that are specialized for a particular purpose, e.g., extended keyboards, adapted for gaming, adapted for music playing, etc. The functional faceplates may have specialized button types that are adapted for a particular use and are also located in custom positions that reflect the particular use employed. When the functional faceplate is removed from the portable computer system, it may have no buttons or it may provide a standard PDA button group. An identification circuit may be employed on the functional faceplate to indicate its button group and signaling characteristics. Alternatively, the functional faceplate may also include a data generation device, e.g., a global positioning system (GPS) or electronic thermometer, a music player, a smart card, etc. Alternatively, the functional faceplate may also include an auxiliary power supply.

12 Claims, 15 Drawing Sheets

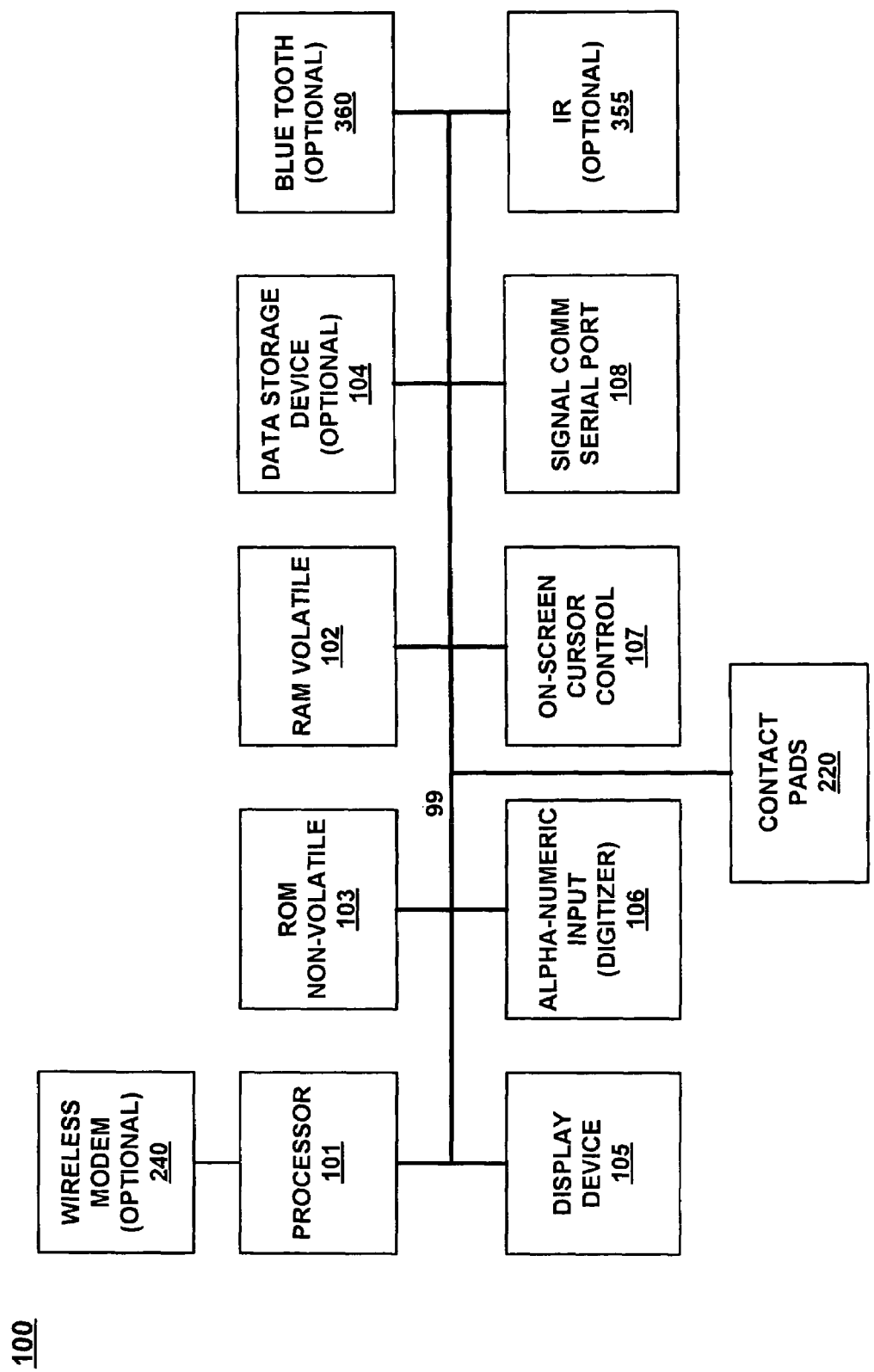

INTEGRATED REMOVABLE FUNCTIONAL FACEPLATE FOR PORTABLE COMPUTER SYSTEM

RELATED US APPLICATION

This is a continuation of copending application(s) Ser. No. 09/844,558 filed on Apr. 27, 2001 now U.S. Pat. No. 6,747,578 which is hereby incorporated by reference to this specification

BACKGROUND OF THE INVENTION

1. Field of the Invention

The present invention relates to the field of data entry devices. More specifically, embodiments of the present invention relate to removable faceplates for a portable computer system or other portable electronic device.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer and electronic notepads, to name a few. Palmtop computers with PIM software have been know as Personal Digital Assistants (PDAs). Many PDAs have a small flat display screen associated therewith one or more buttons or keys that can be pressed by a user.

In addition to PDAs, small flat display screens and push buttons have also been implemented within other portable electronic devices, such as cell phones, electronic pagers, remote control devices and other wireless portable devices.

User convenience and device value are very important factors for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Similarly, the more useful the device, the more the device will be used and acquired. Accordingly, the more the device can be flexible and specialized for particular uses that are important to users, the higher the likelihood that the device will be employed.

One way to personalize or specialize a portable electronic device is to alter the appearance of its faceplate or front cover. Today, many cell phones offer removable faceplates which can be attached to the device. The faceplates have button holes that are adapted fit around existing buttons that are integrated with the cell phone body. The faceplates can alter the overall appearance (e.g., color, pattern, etc.) of the device to fit a user's taste or personal preference. These prior art faceplates, while altering the cosmetic appearance of the device, do not alter the functionality or placement of the underlying buttons which are integrated with the body of cell phone device.

Other faceplates have been offered that not only provide cosmetic changes to the device, but also add some special key designations or key types to the existing buttons of the underlying device. However, the existing buttons of the underlying device are still needed. For instance, some faceplates provide mechanical buttons that are designed to contact and fit over the existing buttons on the device's body. When the mechanical button on the faceplate is depressed, so is the underlying device's button. The mechanical buttons of these prior art faceplates can alter the designations of the existing buttons or add new button types. For instance, a joystick key type (on the faceplate) can be added over a group of existing keys of the device's body. When the joy stick is moved, different keys of the key group are then activated. However, since these prior art faceplates make use of the existing keys of the device, they are limited in their potential key placements, key functionalities and key types. These faceplates may also add significant size and weight to the overall device since their keys are additive to the underlying keys.

SUMMARY OF THE INVENTION

Accordingly, embodiments of the present invention provide an electronic device, e.g., a cell phone, portable computer system, PDA, electronic pager, etc., having a removable functional faceplate. The removable functional faceplate provides additional keys and key functionality that are in addition to any underlying keys of the electronic device (if it has any at all). For instance, removable faceplates can add extended keyboards, gaming controls, etc. The new keys and key functionality can be placed in any location on the faceplate and may be of any key type without restriction to the underlying keys of the electronic device (if it has any at all). Additionally, the functional faceplates may provide circuits which add functionality to the electronic device other than, or in addition to, new keys, e.g., increased memory capacity, increased power capacity, music playing capacity, measurement devices, etc. The faceplates are removable, and in one embodiment, designed to be readily removed and installed by the user. By providing the ability to add new keys to the faceplate, the present invention provides an electronic device that may be substantially customized for a particular user or for a particular and specialized use. The present invention provides these advantages and others not specifically mentioned above but described in the sections to follow.

An integrated removable functional faceplate is described herein for a portable computer system. The removable functional faceplate employs specially located electrical contacts or pads that mate with similarly located electrical contacts mounted on predetermined positions of the portable computer system, e.g., a personal digital assistant (PDA) or other electronic device. The electrical contacts of the functional faceplate carry signals that are responsive to the pressing of physical buttons which may be placed in any location on the functional faceplate. This allows individual faceplates to be developed that are specialized for a particular purpose, e.g., extended keyboards, adapted for gaming, adapted for music playing, adapted for email, paging, etc. The functional faceplates may have specialized button types that are adapted for a particular use and are also located in custom positions that reflect the particular use employed.

When the functional faceplate is removed from the portable computer system, it may have no buttons or it may provide a standard PDA button group.

An identification circuit may be employed on the functional faceplate to indicate its button group and signaling characteristics. Alternatively, the functional faceplate may also include a data generation device, e.g., a global positioning system (GPS) or electronic thermometer, a music player, a smart card, etc. In this case, one or more of the electrical contacts are adapted to receive data signals from this data generation device. Alternatively, the functional faceplate may also include an auxiliary power supply (e.g., battery, solar power, etc.). In this case, one or more of the electrical contacts are adapted to receive a power signal from this auxiliary power source.

The removable integrated functional faceplate of the present invention permits a user to add additional specific functionality to its PDA, for instance gaming (e.g., controls, four way control, joystick, etc.) and email (e.g., a keyboard). In order to lessen the size and weight of the PDA, in one embodiment, the functional faceplates may become an integrated part of the PDA and not an add-on accessory. In one implementation, the faceplates may be molded in plastic and removably attached to the PDA via a hook and snaps combination, although any attachment mechanism can be used, e.g., rail and slot, screws, etc. It is appreciated that the faceplate does not need to be of the same size as the PDA, but could be larger depending on the type of use intended.

More specifically, an embodiment of the present invention includes a faceplate for an electronic device comprising: a housing adapted to be removably secured onto the electronic device; a plurality of electrical contacts disposed on the housing and operable to mate with corresponding electrical contacts of the electronic device when the housing is secured onto the electronic device; and a plurality of buttons disposed on the housing and, when activated, for causing signals to be generated over the electrical contacts indicating which buttons were activated and when activated. Embodiments include the above and further comprising a code generation device responsive to activation of the plurality of buttons and coupled to the electrical contacts of the faceplate, the code generation device for generating the signals over the electrical contacts which indicate which buttons where activated and when activated.

Embodiments include the above and further comprising an identification unit disposed on the housing and coupled to the electrical contacts of the faceplate, the identification unit for identifying the faceplate to the electronic device. Embodiments include the above and further comprising an auxiliary power supply disposed on the housing and coupled to the electrical contacts of the faceplate, the auxiliary power supply for supplying power to the electronic device.

Embodiments include the above and further comprising a data signal generation device disposed on the housing and coupled to the electrical contacts of the faceplate, the data signal generation device for supplying data signals to the electronic device wherein the data signal generation device may be a music player or an environmental measuring device or a memory card or a global positioning system (GPS).

BRIEF DESCRIPTION OF THE DRAWINGS

FIG. 1 is a logical block diagram of components of an exemplary portable computer system, e.g., personal digital assistant, that can be used in accordance with an embodiment of the present invention.

DETAILED DESCRIPTION OF THE INVENTION

Figure 2A:
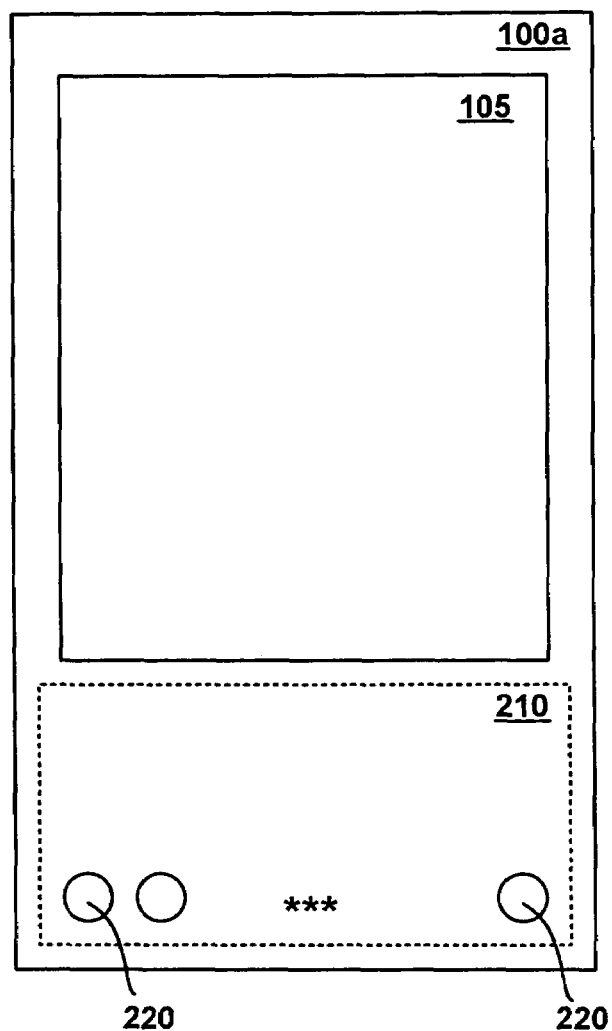
FIG. 2A is a front view of a portable computer system of one embodiment of the present invention having its removable faceplate removed thereby exposing its button bezel region which has multiple electrical contacts disposed therein.

In the following detailed description of the present invention, an integrated removable functional faceplate for a portable computer system or other intelligent device, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Exemplary Portable Electronic Device Platform

Although the functional faceplate of the present invention can be implemented in a variety of different electronic systems such as a pager, a cell phone, a remote control device, etc., one exemplary embodiment includes the integration of the faceplate with a portable electronic device or PDA.

FIG. 1 illustrates circuitry of an exemplary portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101.

Computer system 110 also includes an optional data storage device 104 (e.g., thin profile removable memory) coupled with the bus 99 for storing information and instructions. Device 104 can be removable. Device 104 may also be an SDROM card reader or equivalent removable memory reader.

Also included in computer system 100 of FIG. 1 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101. In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 for later analysis.

System 110 of FIG. 1 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer of 106 or 107 can be implemented using well known devices, for instance, using the ADS-7846 device by Burr-Brown that provides separate channels for spatial stroke information and pressure information.

System 100 also contains a flat panel display device 105 coupled to the bus 99 for displaying information to the computer user. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with a cradle. In one embodiment, the serial communication interface 108 is a serial communication port, but could also alternatively be of any of a number of well known communication standards and protocols, e.g., parallel, SCSI, Firewire (IEEE 1394), Ethernet, etc. In addition to device 108, wireless communication links can be established between the device 100 and a host computer system (or another portable computer system) using a Bluetooth wireless device 360, an infrared device 355, a GSM radio device 240, or a CDMA device, or a W-CDMA device or a 802.11 device. Device 100 may also include a wireless modem device 240 and/or a wireless radio, e.g., a GSM wireless radio with supporting chipset. The wireless modem device 240 is coupled to communicate with the processor 101 but may not be directly coupled to port 108.

In one implementation, the Mobitex wireless communication system may be used to provide two way communication between system 100 and other networked computers and/or the Internet, e.g., via a proxy server. In other embodiments, TCP protocol can be used or SMS can be used. System 100 of FIG. 1 may also contain batteries for providing electrical power.

Also shown in FIG. 1 are a group of electrical contacts or pads 220 that are disposed on the portable computer system and made available for mating with a removable faceplate, in accordance with an embodiment of the present invention. These electrical contacts 220 are internally coupled to bus 99. In one embodiment, these electrical contacts are exposed when the removable faceplate is removed from the device 100. Depending on the particular embodiment, as discussed below, some of the pads 220 are used to carry different signal types that may be generated from the faceplate, e.g., they are used (1) to carry code signals used by the processor 101 to differentiate between which buttons are pressed on the faceplate and when; (2) to carry power; (3) to carry an identification code of the faceplate; and (4) to carry data signals from a data signal generation device on the faceplate.

Functional Faceplate of the Present Invention

FIG. 2A illustrates a front view of a portable computer system 100a in accordance with one embodiment of the present invention with its faceplate removed. In this example, system 100a may be a hand-held computer system or PDA but could be any portable electronic device (e.g., pager, cell phone, etc.). Flat panel display screen 105 is located in the central portion. A recess 210 may be cut out for receiving a button region from a removable faceplate (not shown). Also shown are the electrical contacts 220 which are disposed within the recess 210 in this embodiment and are exposed. There may be as few as two electrical contacts 220 in accordance with the present invention. The electrical contacts 220 are for mating with contacts from a removable faceplate. These electrical contacts or pads 220 allow the removable faceplate to communicate signals with the device 100a, e.g., button selection signals and other data, and/or power signals. In the example 100a shown in FIG. 2A, there are no keys or buttons located on the face of device 100a with the faceplate removed. In this particular embodiment, the device 100a requires a faceplate for full functionality.

Figure 2B:
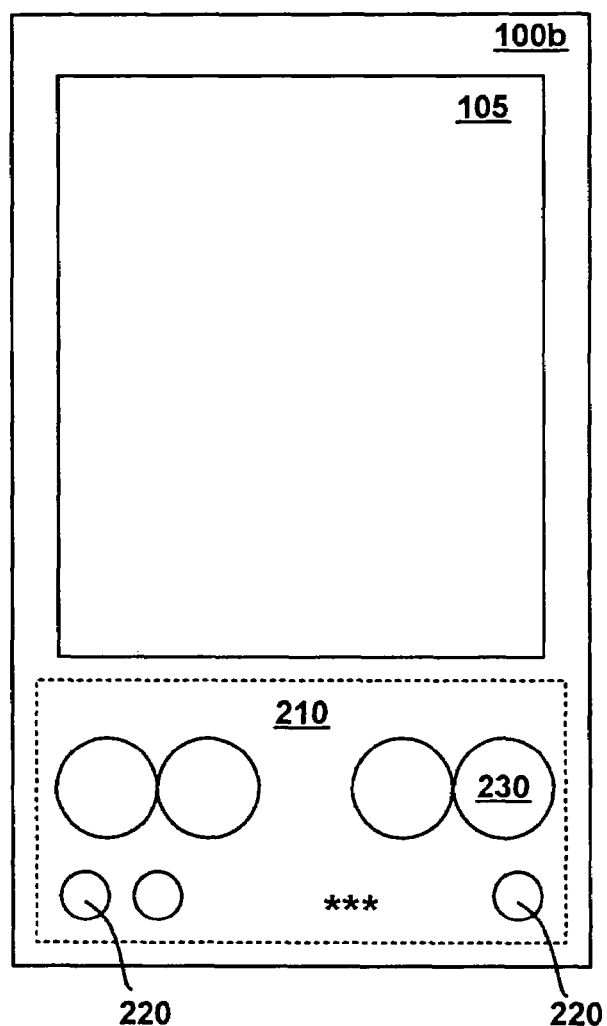
FIG. 2B is a front view of a portable computer system of another embodiment of the present invention having its removable faceplate removed thereby exposing its button bezel region which has multiple electrical contacts disposed therein along with some fixed-position integrated buttons.

FIG. 2B illustrates another embodiment 100b of the present invention. FIG. 2B illustrates a front view of a portable computer system 100b with its faceplate removed. As in FIG. 2A, electrical contacts 220 of FIG. 2B are also located within region 210 of device 100b. In this example, there is some basic button functionality 230 on device 100b even when the faceplate of the present invention is removed. Buttons 230 are located within recess 210 and are integrated within the body of device 100b. Any faceplate that is to be attached to device 100b will generally have cut-outs to accommodate the existing buttons 230 and may also add other, additional, buttons which communicate using pads 220 as described further below.

Figure 3:
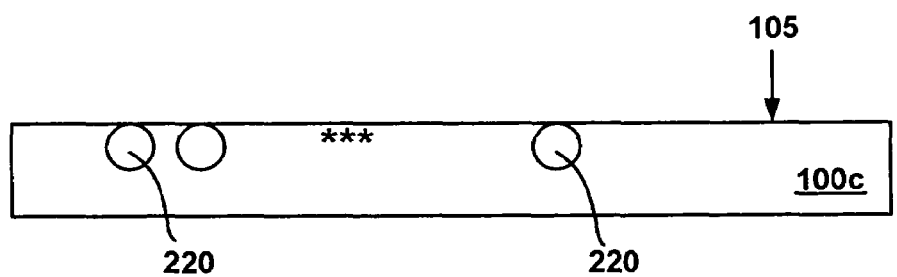
FIG. 3 is a side view of a portable computer system of another embodiment of the present invention having its electrical contacts mounted along the side edge of the device.

FIG. 3 illustrates another embodiment 100c of the present invention. In this example, device 100c is shown in side-view and its electrical contacts 220 are located along the side of the device 100c. It is appreciated that the electrical contracts may be located within region 210 of the device as well as along the edge of the device. Provided electrical contacts are located along the edge of the device, corresponding mating contacts would be required along the back side of the edge of any removable faceplate adapted for attaching to device 100c.

Figure 4:
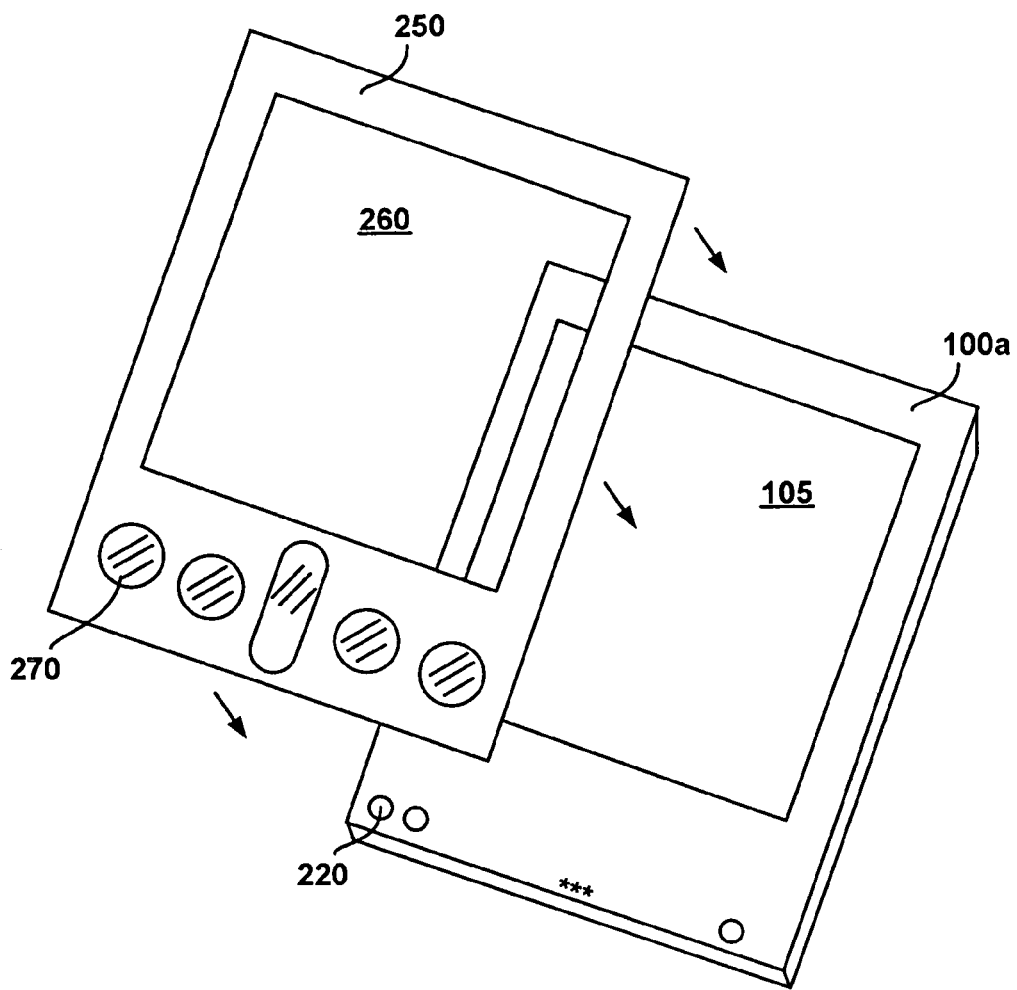
FIG. 4 is a perspective view of a portable computer system having its removable faceplate attached thereto in accordance with embodiment of the present invention.

FIG. 4 illustrates a perspective view of a faceplate 250, in accordance with an embodiment of the present invention, and also a portable computer system 100a adapted to receive the faceplate 250. In one embodiment, the faceplate 250 is removably attached to device 100a by pressure and by snap fitting hooks and mechanisms. In this way, the faceplate 250 can readily be removed from device 100a and replaced. The front side of the faceplate 250 is shown and is made of a housing (e.g., molded plastic) that bears buttons 270 or "keys."

The faceplate keys 270, in accordance with the present invention, may be placed in any location and are not limited in position to the locations of any keys that are integrated on device 100a (if any). In the example shown in FIG. 4, the device 100a does not have any keys on its face. The front side of faceplate 250 illustrates a cut-out region 260 for positioning around display 105. When attached to the device 100a, contacts (not shown) on the rear side of the faceplate 250 will come into physical contact with electrical pads 220 located on the device 100a. In this way, the faceplate 250 may communicate with the electronics of device 100a. It is appreciated that the exterior of device 100a may include a recess of roughly the same area and size as the faceplate 250 and this recess may be used to accept the faceplate 250 therein. In this way, the overall size of the PDA with the attached faceplate is reduced and the faceplate 250 becomes integrated with the PDA 100a.

Figure 5A:
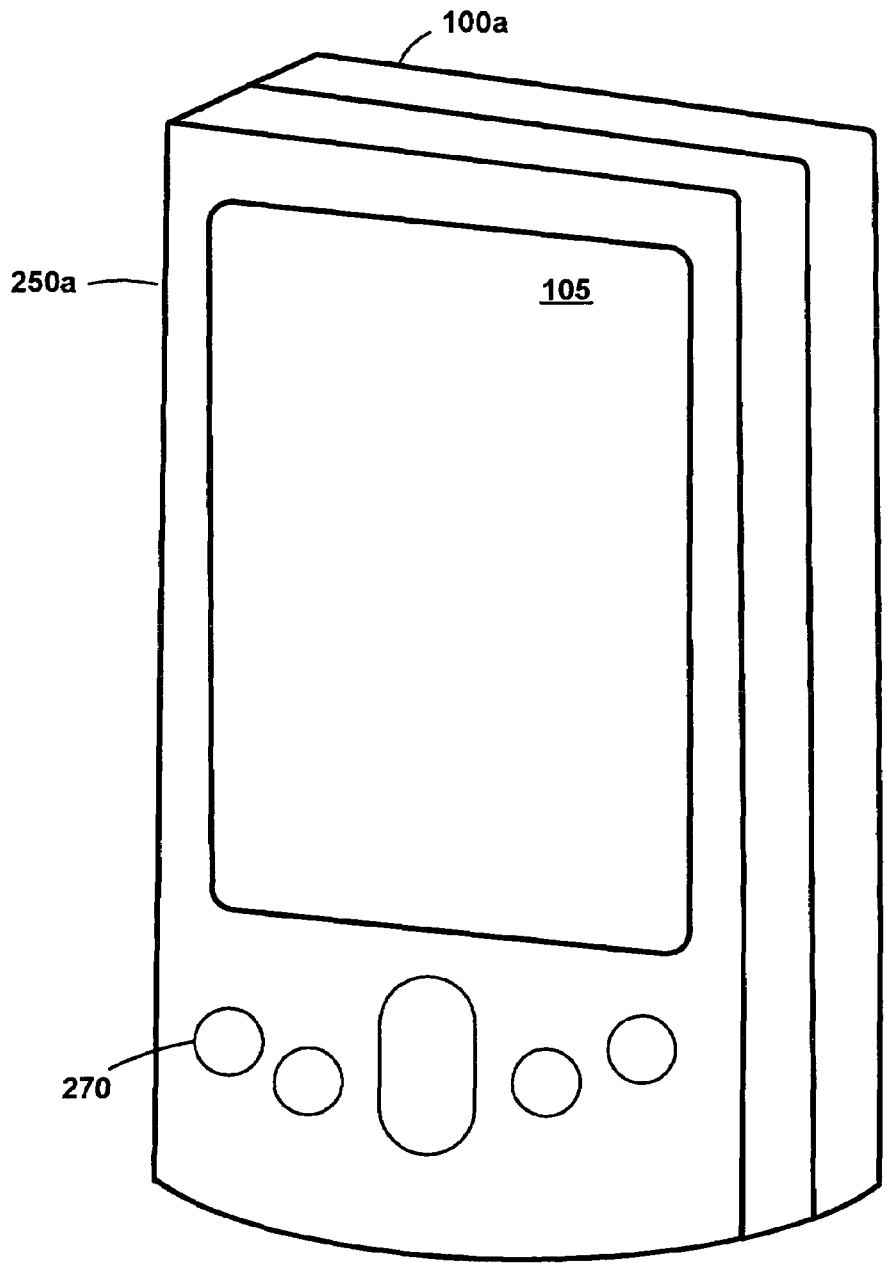
FIG. 5A is a perspective view of a portable computer system having snapped thereon a basic removable faceplate in accordance with an embodiment of the present invention.
Figure 7:
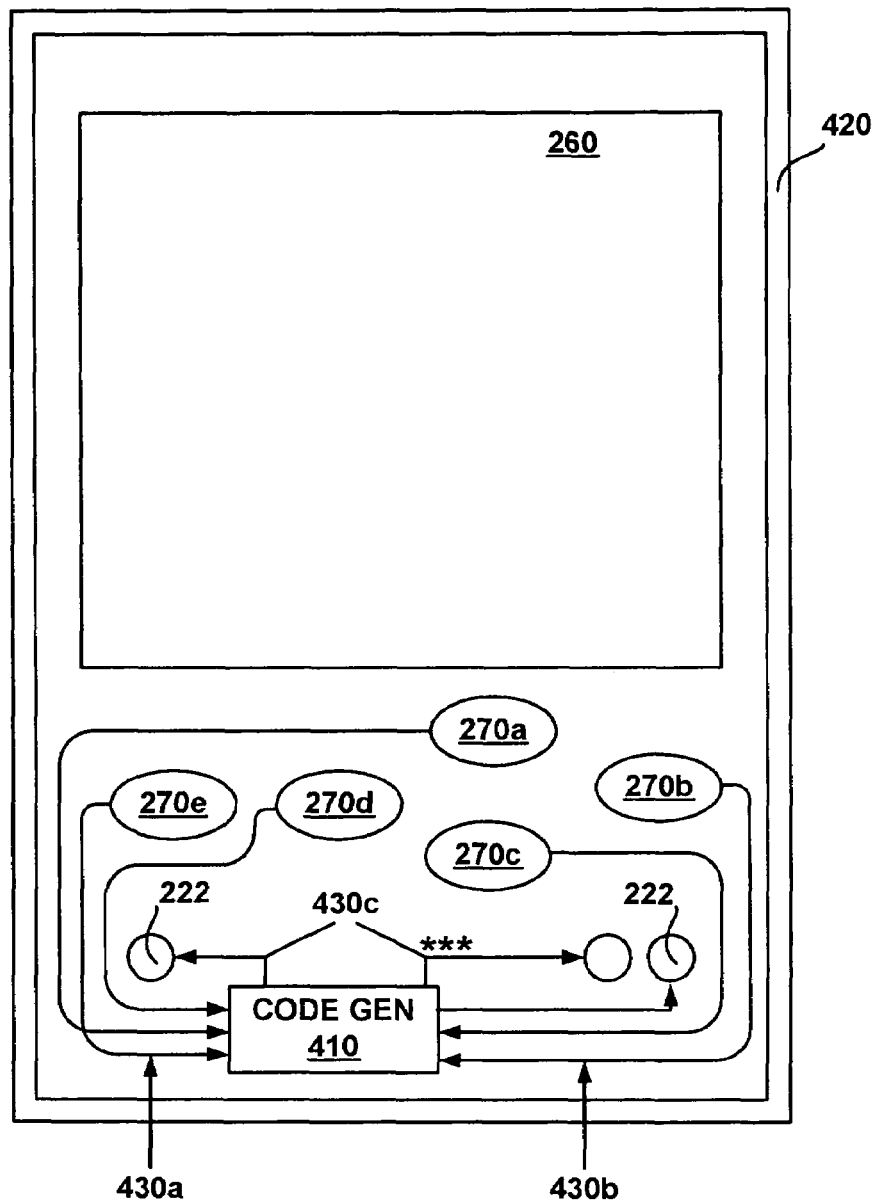
FIG. 7 illustrates the back side of a removable faceplate in accordance with an embodiment of the present invention having freely positioned buttons and specially located electrical contacts.

FIG. 5A illustrates one example device 310a in accordance with an embodiment of the present invention. In this example, faceplate 250a is attached to and integrated with device 100a. This faceplate 250a is roughly the same width and length as the device 100a but could be larger in size. The faceplate 250a is a housing that contains multiple standard buttons 270 for PDA access, e.g., six buttons are shown. This faceplate 250a is contemplated as being a basic or base faceplate that would be shipped with the PDA 100a. Not shown are internal electrical contacts on the rear side of the faceplate 250a that make contact with corresponding electrical contacts of the front side of device 100a when the two components are snapped together. These contacts 222 are shown in FIG. 7. In the embodiment of FIG. 5A, user selections of buttons 270 are translated into coded signals which are generated over the electrical contacts and processed by device 100a. Using these coded signals, the device 100a can determine which buttons where pressed and when.

Figure 5B:
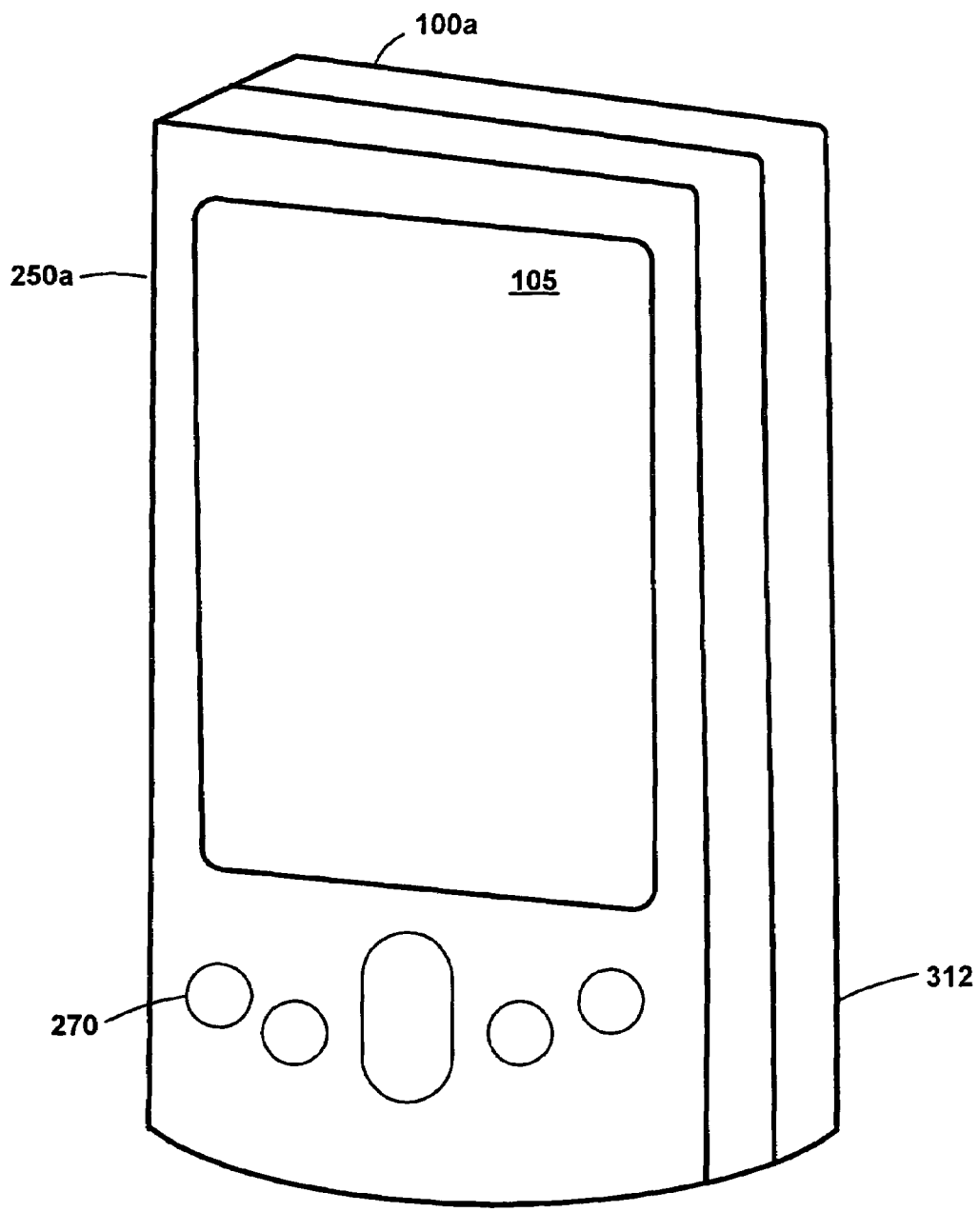
FIG. 5B is a perspective view of a portable computer system having snapped thereon a basic removable faceplate with a slot for receiving a removable memory device in accordance with an embodiment of the present invention.

FIG. 5B is analogous to FIG. 5A except the portable computer system 310b has snapped thereon a basic removable faceplate with a slot 312 for receiving a removable memory device in accordance with an embodiment of the present invention.

Figure 6:
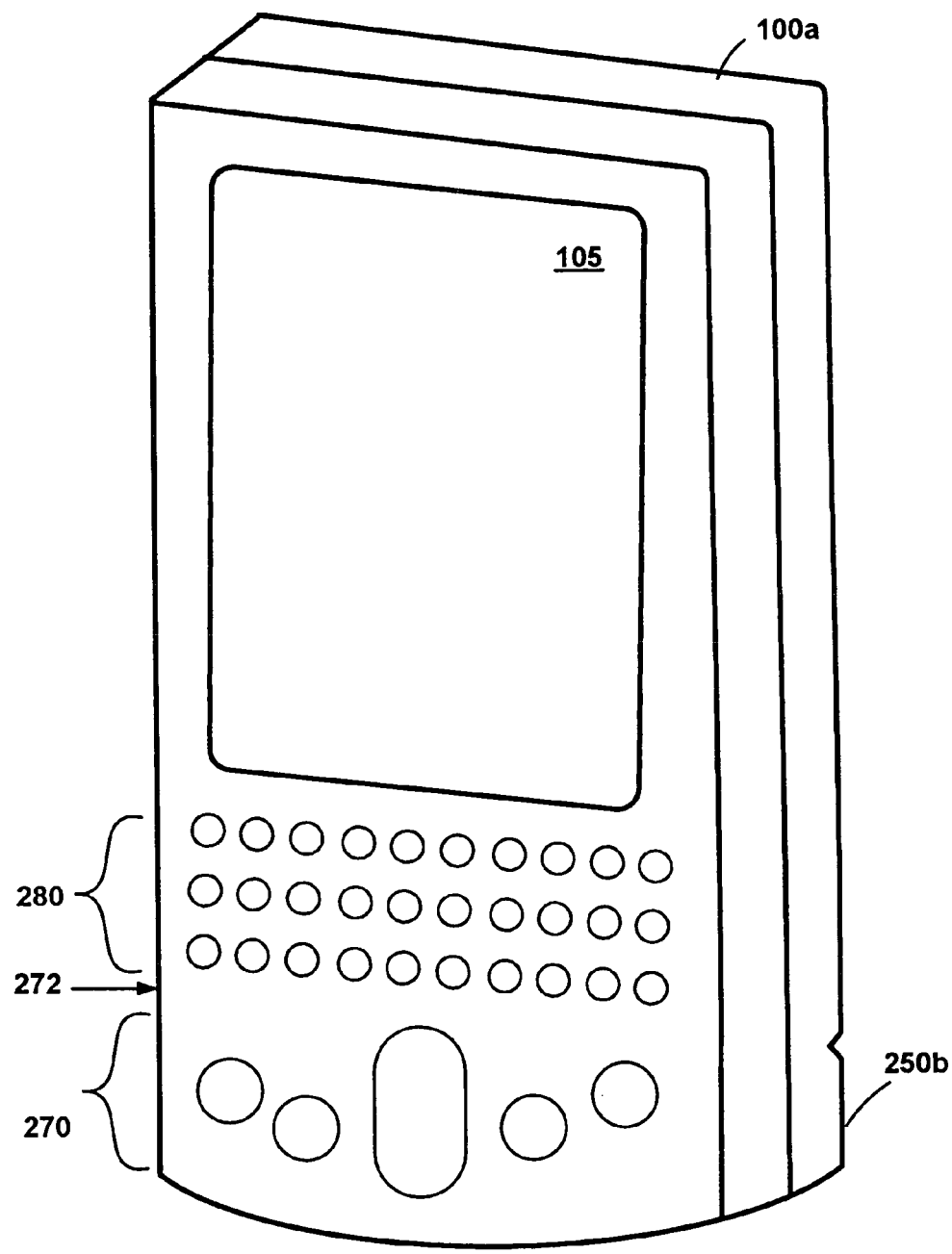
FIG. 6 is a perspective view of a portable computer system having snapped thereon an extended removable faceplate in accordance with an embodiment of the present invention.

FIG. 6 illustrates one example device 320 in accordance with an embodiment of the present invention using an extended faceplate integrated with the device 100a. In this example, an extended faceplate 250b is attached to device 100a. This faceplate 250b is roughly the same width as device 100a but is longer in length to accommodate an extended keyboard. The faceplate is a housing that contains the six standard buttons 270 for PDA access but also contains a full alphanumeric keyboard 280 which may be used for text entering. Also included are function keys 272. This faceplate 250b can be used by any user requiring the particular key layout shown to customize the device to their particular needs and work. Not shown are internal electrical contacts on the rear side of the faceplate 250b that make contact with corresponding electrical contacts of the front side of device 100a when the two components are snapped together. In this embodiment, user selections of buttons 270, 272 or 280 are translated into coded signals which are generated over the electrical contacts and processed by device 100a. Using these coded signals, the device 100a can determine which buttons where pressed and when.

Importantly, faceplates 250a or 250b can interchangeably be removed attached to device 100a depending on the user's needs. For instance, if a user performs a large degree of text data entering or responds to pages, he/she may want a pager-like interface with their PDA 100a. In this case, faceplate 250b can be used to customize the PDA 100a for this particular use. However, if the user wants a smaller footprint, e.g., they are traveling, then faceplate 250a can be used.

FIG. 7 illustrates the rear or back side view of faceplate 250a (and can also represent the rear side view of faceplate 250b). According to this embodiment, mechanical buttons 270a-270e are electrically connected to a code generation device 410 via ribbon cable (or "flex circuits") 430a and 430b. The mechanical buttons 270a-270e are mounted on housing 420 and may be placed in any location on the housing 420 and are basically electrical switches with a mechanical key. In one embodiment, the housing 420 is made of a molded plastic or resin or a flexible metal material.

The code generator device 410 is disposed on housing 420 is connected to electrical contacts 222 via ribbon cable ("flex circuits") 430c. As discussed above, contacts 222 are operable to come into physical contact with electrical pads 220 of device 100a when faceplate 250a is attached to device 100a. The code generator 410 is responsive to signals from cables 430a and 430b which indicate which button is pressed and when. The code generator 410 is capable of generating a unique digital or analog signal (button code) over contacts 222 indicating which button was pressed. It is appreciated that the button code is generated over contacts 222 simultaneously with the button being pressed. It is appreciated that many well known code generators could be used for this function, including numerous different types of digital and/or analog code generators.

It is appreciated that the key or button layout of faceplate 250a is very flexible in that keys or buttons can be placed in any position on the faceplate housing 420. Further, these keys 270a-270e can be made available to the device 100a as a result of the contacts 222 which are positioned at predetermined locations for mating with contacts 220 of device 100a.

Figure 8:
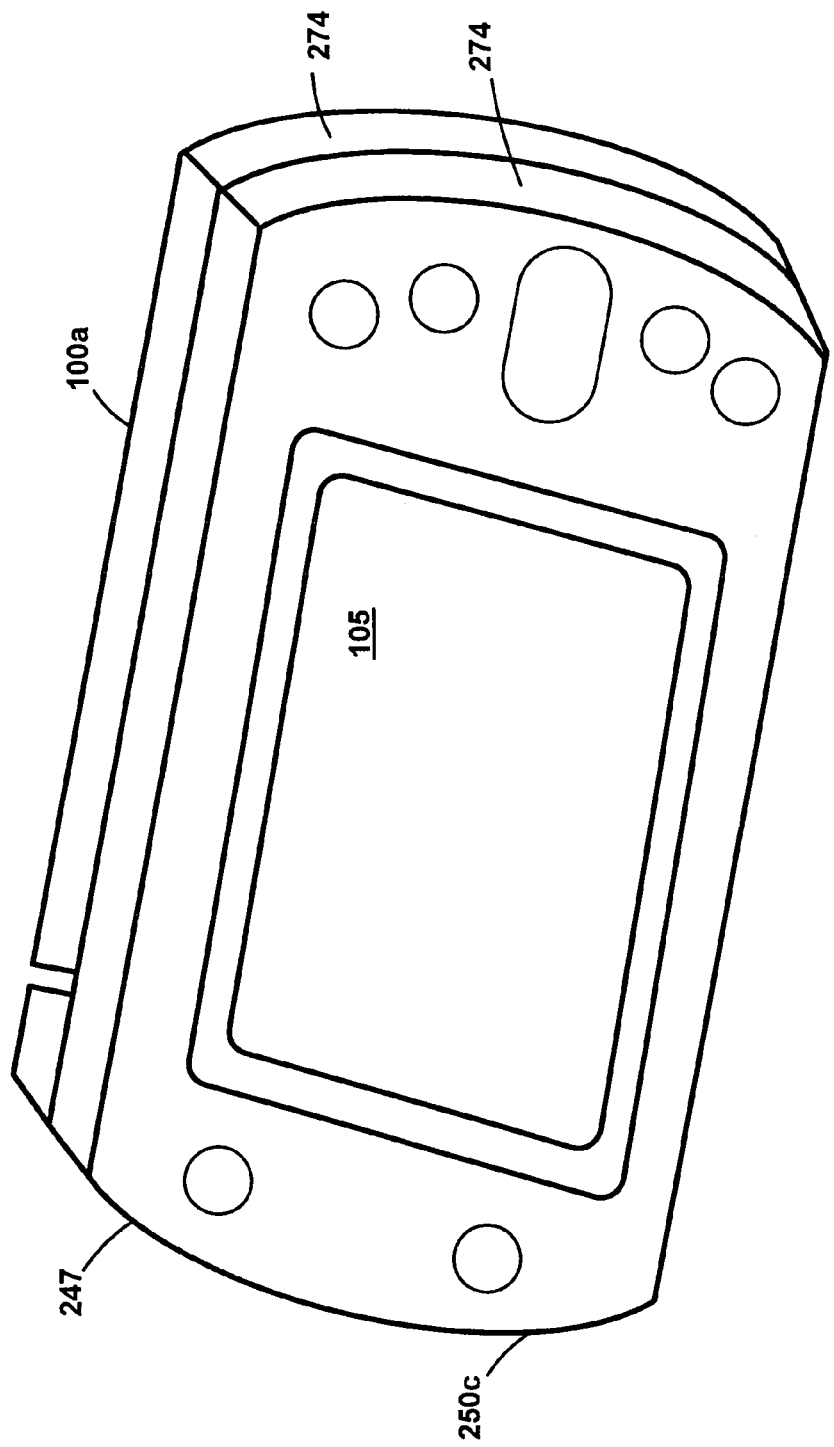
FIG. 8 is a perspective view of a portable computer system having snapped thereon a gaming removable faceplate in accordance with an embodiment of the present invention.

FIG. 8 illustrates one example device 330 in accordance with an embodiment of the present invention. In this example, a faceplate 250c is attached to and integrated with device 100a but is used with the PDA in such a way that it is held length-wise rather than width-wise. The buttons 274 are then placed on the left and right sides to facilitate gaming. This faceplate 250c is roughly the same width but longer in length than the device 100a. The faceplate is a housing that contains special buttons 274 adapted for gaming applications (e.g., start, stop, reset, A/B, joystick, etc.). The buttons 274 are also positioned in places to provide the best gaming experience possible. Not shown are internal electrical contacts on the rear side of the faceplate 250c that make contact with corresponding electrical contacts of the front side of device 100a when the two components are snapped together. In this embodiment, user selections of buttons 274 are translated into coded signals which are generated over the electrical contacts and processed by device 100a. Using these coded signals, the device 100a can determine which buttons where pressed and when.

Importantly, faceplates 250a-250c can interchangeably be attached to device 100a depending the way in which the user wants to use the device 100a. For instance, if a user plays games, he/she may want a game-like interface with the PDA 100a. In this case, faceplate 250c can be used to customize the PDA 100a for this particular use. Therefore, the removable integrated functional faceplates discussed herein permit the user to add additional specific functionality to their PDA such as gaming (joystick) and email (keyboard) or standard PDA use. Also, the faceplates of the present invention, when installed, become an integrated part of the PDA and are not necessarily an add-on accessory which potentially could add additional size to the device.

Figure 9:
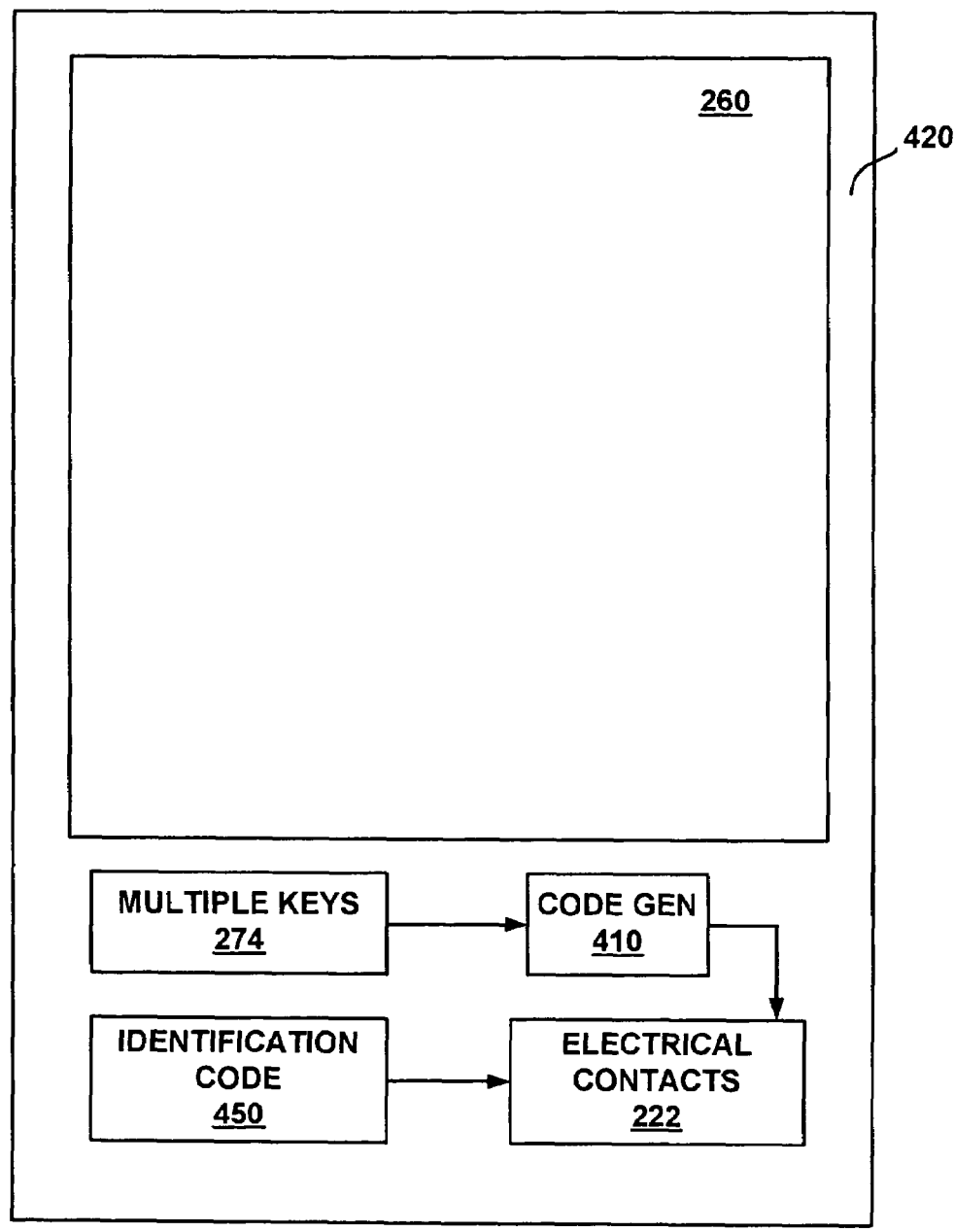
FIG. 9 illustrates the back side of a removable faceplate in accordance with an embodiment of the present invention having an identification code installed therein.

FIG. 9 illustrates the rear or back side view of faceplate 250c in block diagram form. Faceplate 250c is similar to faceplate 250a (FIG. 7) except that the keys are laid out differently and faceplate 250c utilizes an optional identification code device 450. Identification code device 450 can be realized either using either electrical components or mechanical components. Identification code device 450 is coupled to an electrical contact 222 and is able to communicate a code to device 100a indicating the identity or type of faceplate that it is. The identity code can help the device 100a to interpret the coded signals generated by the code generator 410. Using the identification code 450, each faceplate adapted for coupling with the device 100a would have its own ID code value. In one embodiment, identification code 450 can be realized using a programmed memory cell.

Figure 10:
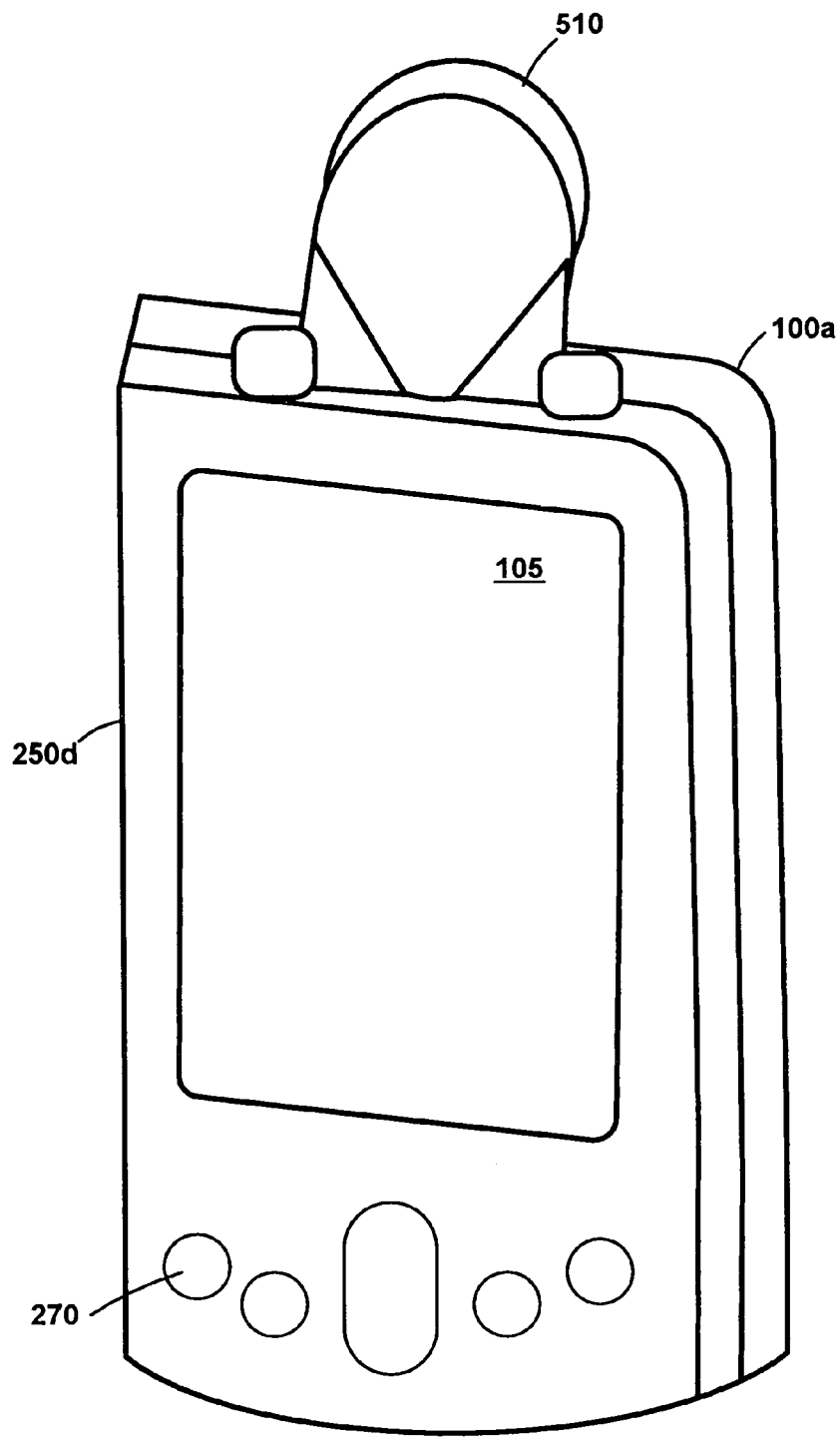
FIG. 10 is a perspective view of a portable computer system having snapped thereon a special function removable faceplate in accordance with an embodiment of the present invention.

FIG. 10 illustrates one example device 340 in accordance with an embodiment of the present invention that adds special functionality to the PDA in addition to buttons and button layouts. In this example, a faceplate 250d is attached to a device 100a and adds global positioning system (GPS) functionality. This faceplate 250d is roughly the same size as the device 100a but a GPS receiver 510 is mounted on the housing of the faceplate 250d. The faceplate also contains standard PDA buttons 270 adapted for PDA applications. Not shown are internal electrical contacts on the rear side of the faceplate 250d that make contact with corresponding electrical contacts of the front side of device 100a when the two components are snapped together. In this embodiment, user selections of buttons 270 are translated into coded signals which are generated over the electrical contacts and processed by device 100a. Using these coded signals, the device 100a can determine which buttons where pressed and when. The GPS device 510 also communicates with device 100a using these contacts.

Faceplates 250a-250d can interchangeably be attached to device 100a depending on the user's need. For instance, if a user needs GPS functionality, he/she may snap-on faceplate 250d. In this case, faceplate 250d can be used to customize the PDA 100a for this particular use.

Figure 11:
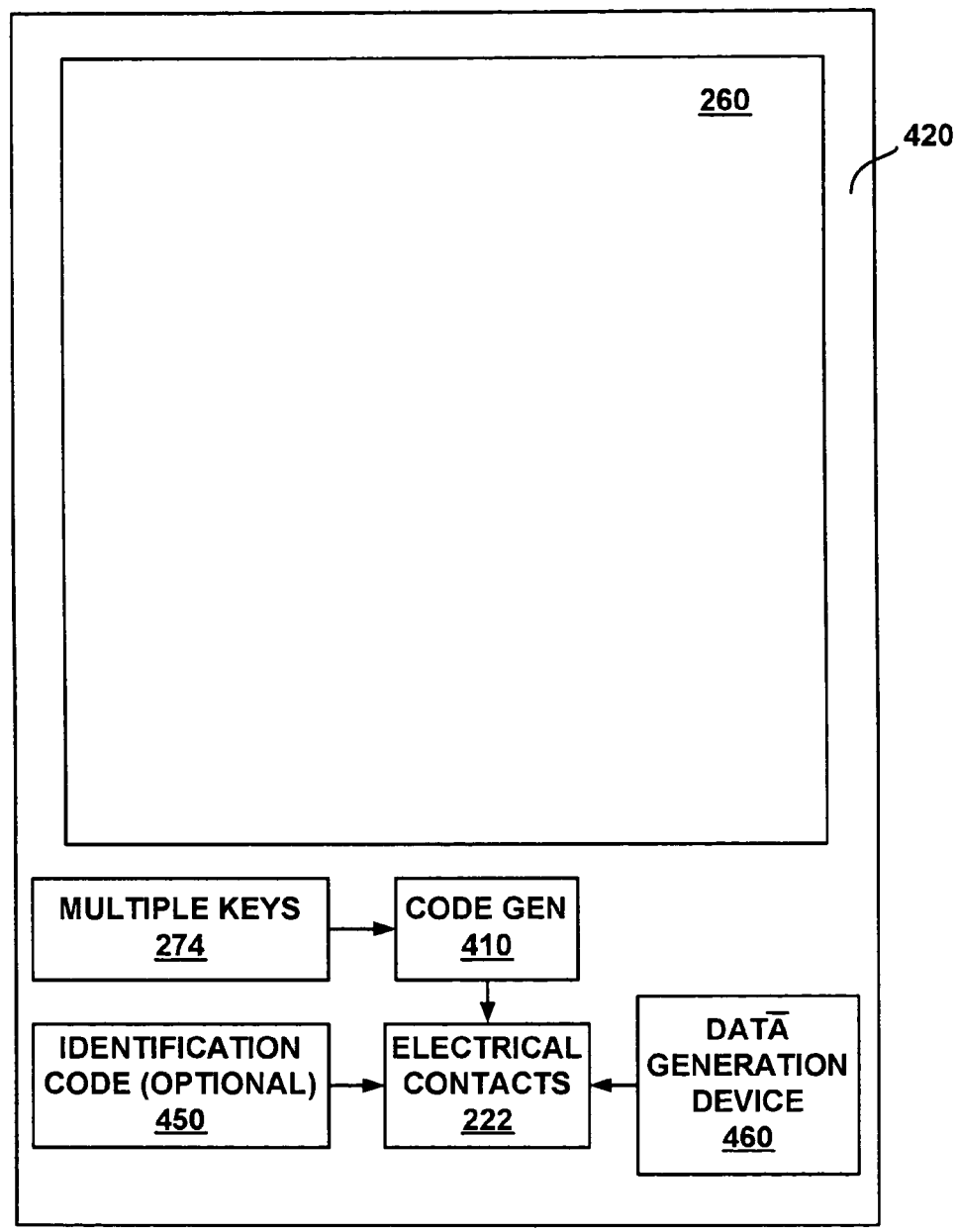
FIG. 11 illustrates the back side of a removable faceplate in accordance with an embodiment of the present invention having a data generation device installed therein.

FIG. 11 illustrates the rear or back side view of faceplate 250d in block diagram form. Faceplate 250d is similar to faceplate 250a (FIG. 7) except that faceplate 250d contains a data signal generation device 460. The data signal generation device 460 in this example is a GPS device, but could be any module. The data signal generation device 460, including device 510, is coupled to electrical contacts 222 and is able to communicate data signals to device 100a in this fashion. GPS applications on device 100a can then be used to present the data signals to the user. Other possible data signal generation devices 460 could include environmental measuring devices, such as an electronic thermometer, an electronic light meter, an electronic wind meter, an electronic sound meter, an electronic color meter, etc. An optional identification circuit 450 may also be employed.

Using data signal generation devices 460, the faceplates of the present invention can add significant optional features and capabilities to the standard PDA unit 100a in a flexible and readily user-installable fashion.

Figure 12:
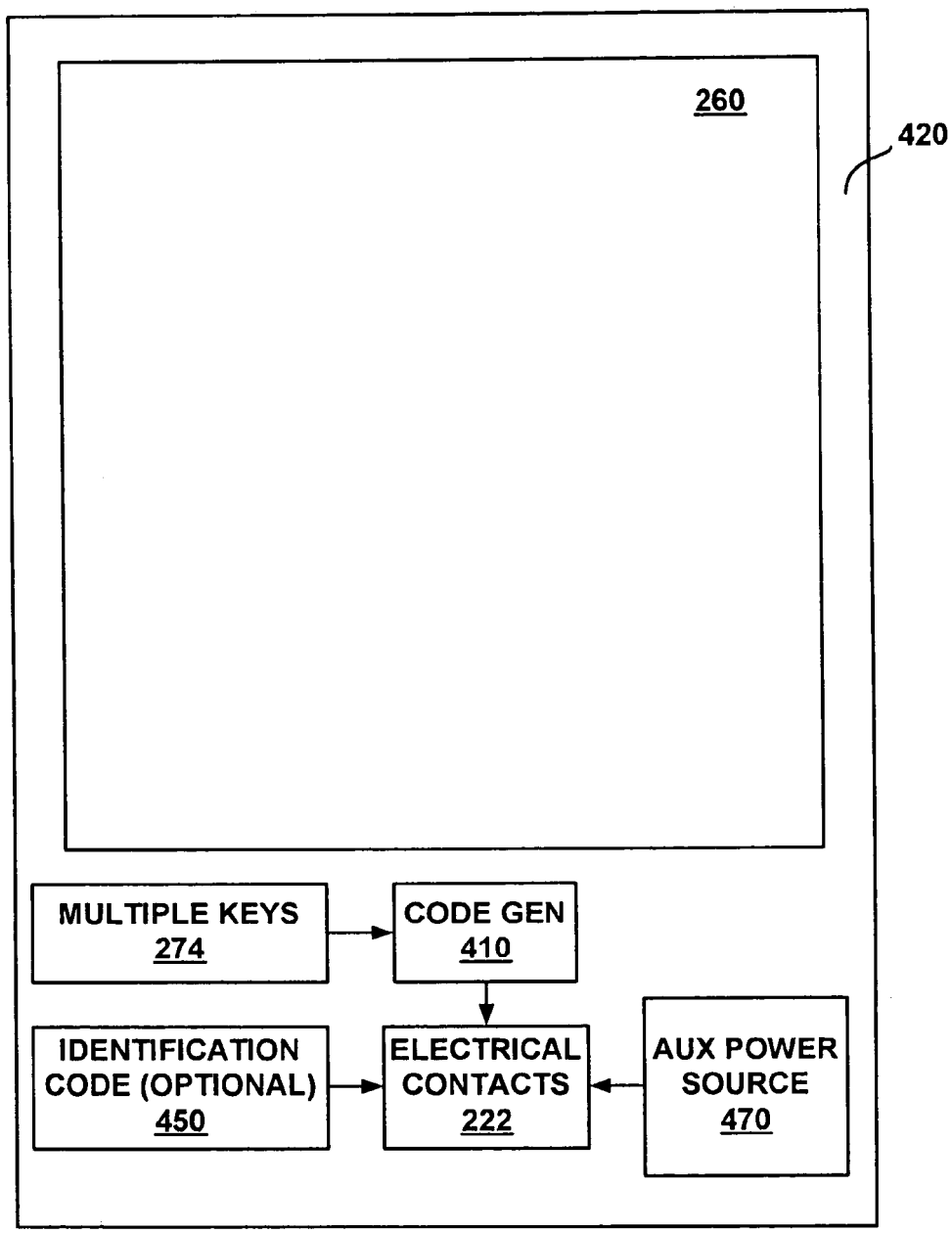
FIG. 12 illustrates the back side of a removable faceplate in accordance with an embodiment of the present invention having an auxiliary power source installed therein.

FIG. 12 illustrates the rear or back side view of another faceplate 250e which adds an auxiliary power supply module 470 to housing 420. Faceplate 250e is similar to faceplate 250d except that faceplate 250e contains the auxiliary power supply module 470. The auxiliary power supply module 470 is useful for providing extra power to device 100a for applications that consume large amounts of battery power, e.g., music playing applications and related electronics, etc. The auxiliary power supply module 470 is coupled to electrical contacts 222 and is able to provide power to device 100a in this fashion. It is appreciated that module 470 may be a battery (replaceable or rechargeable) or may be a solar cell. An optional identification circuit 450 may also be employed.

Figure 13:
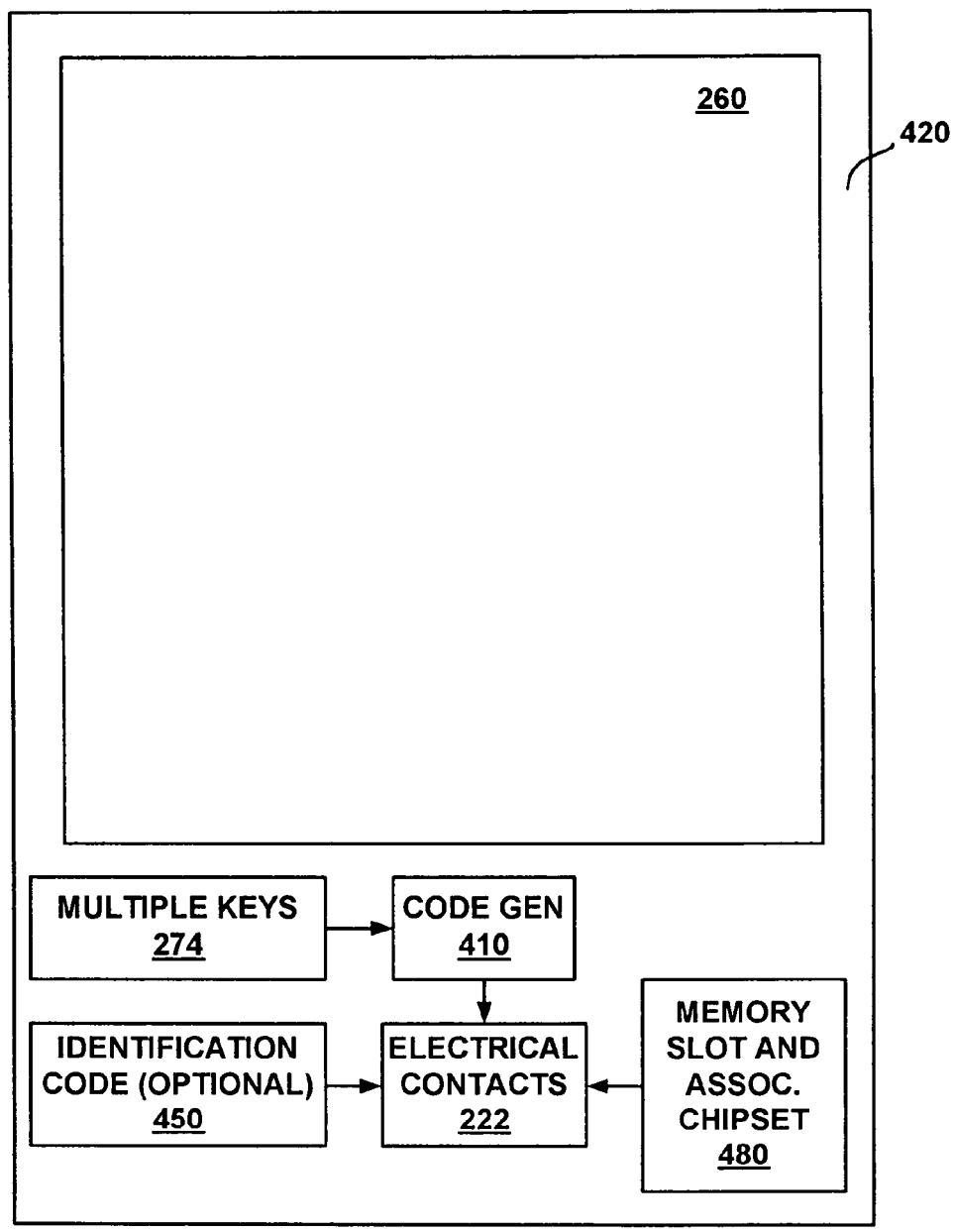
FIG. 13 illustrates the back side of a removable faceplate in accordance with an embodiment of the present invention having a receiving slot (for a memory card) and associated chipset installed therein.

FIG. 13 illustrates the rear or back side view of another faceplate 250f which is similar to faceplate 250d except the data signal generation device is a data storage device rather than a data measurement device. In this example, the data storage device 480 includes a memory slot to receive a memory card (e.g., flash, SDROM, Memory Stick, etc.), and associated chipset electronics. The memory module 480 is useful for providing additional removable storage capability for the device 100a (e.g., provided unit 104 is also a memory card slot) or memory module 480 can be used to provide removable memory storage functionality for a device 100a not already having such functionality. The memory module 480 is coupled to electrical contacts 222 and is able to provide memory storage (e.g., data) for device 100a in this fashion. Alternatively, device 480 could also be a music storage and playback device. The identification code device 450 is optional.

Other functionality that could be added by unit 480 includes an expansion module connector or bus that is adapted for receiving standard sized electronic modules. Also possible are wireless communication devices, such as Bluetooth modules, IR modules, etc. The unit 480 could also be an expanded display screen. An such device would be coupled to contacts 222.

According to the various embodiments of the present invention, the electrical contacts 222 may carry a number of different signal types. For instance, some contacts may be reserved for key code information relating to the buttons that were pressed. In addition, two contacts may be reserved to supplying auxiliary power to the device 100*a*. Also, various contacts may be reserved for supplying an identification code to device 100*a* to indicate the faceplate type, e.g., standard PDA type, extended keyboard type, gaming type, GPS type, music type, etc. Other contacts can be reserved for supplying data signals (analog or digital) to device 100*a*.

The preferred embodiment of the present invention, an integrated removable functional faceplate for a portable computer system or other intelligent device, is thus described. While the present invention has been described in particular embodiments, it should be appreciated that the present invention should not be construed as limited by such embodiments, but rather construed according to the below claims.

What is claimed is:

1. A faceplate for an electronic device comprising:
   a housing adapted to be removably secured onto said electronic device, wherein said housing includes a cut-out region for position around a display of said electronic device;
   a plurality of buttons disposed on said housing and adapted to be communicatively coupled to said electronic device when said housing is secured onto said electronic device, wherein one or more of said plurality of buttons are configured to provide access to a functionality that is in addition to any functionality of said electronic device; and
   a global positioning system (GPS) receiver, disposed on said housing and communicatively coupled to said electronic device when said housing is secured onto said electronic device, wherein said global positioning system (GPS) receiver provides said additional functionality.

2. A faceplate as described in claim 1 further comprising a code generation device, communicatively coupled between said plurality of buttons and said electronic device when said housing is secured onto said electronic device, for generating signals which indicate which buttons were activated and when activated.

3. A faceplate as described in claim 1 further comprising an identification unit, communicatively coupled to said electronic device when said housing is secured onto said electronic device, for identifying said faceplate to said electronic device.

4. A faceplate as described in claim 1 further comprising an auxiliary power supply disposed on said housing and coupled to supply power to said electronic device when said housing is secured onto said electronic device.

5. A faceplate for a portable computer system comprising:
   a housing adapted to be removably secured onto said portable computer system, wherein said housing includes a cut-out region for position around a display of said portable computer system;
   a plurality of buttons disposed on said housing and adapted to be communicatively coupled to said portable computing system when said housing is secured onto said portable computing system; and
   an environmental measuring device disposed on said housing and adapted to be communicatively coupled to said portable computing system when said housing is secured onto said portable computing system, wherein said environmental measuring device provides a functionality that is in addition to functionality provided by said portable computing system.

6. A faceplate as described in claim 5 further comprising a code generation device, communicatively coupled between said plurality of buttons and said electronic device when said housing is secured onto said electronic device, for generating signals which indicate which buttons were activated and when activated.

7. A faceplate as described in claim 5 further comprising an identification unit, communicatively coupled to said electronic device when said housing is secured onto said electronic device, for identifying said faceplate to said portable computer system.

8. A faceplate as described in claim 5 further comprising an auxiliary power supply disposed on said housing and coupled to supply power to said electronic device when said housing is secured onto said electronic device.

9. A device comprising:
   an electronic device comprising a device housing adapted to removably receive a plurality of faceplate types; and
   a removable faceplate comprising:
      a faceplate housing adapted to be removably secured onto said electronic device, wherein said faceplate housing includes a cut-out region for position around a display of said electronic device;
      a plurality of buttons disposed on said faceplate housing and configured as one of said plurality of faceplate types, wherein said plurality of buttons are adapted to be communicatively coupled to said electronic device when said housing is secured onto said electronic device;
      a global positioning system (GPS) receiver, communicatively coupled to said electronic device when said housing is attached to said electronic device for providing additional functionality that is not provided by said electronic device.

10. A device as described in claim 9 wherein said removable faceplate further comprises a code generation device, communicatively coupled between said plurality of buttons and said electronic device when said removable faceplate is attached to said electronic device, for generating said signals over said electrical contacts which indicate which buttons were activated and when activated.

11. A device as described in claim 9 wherein said removable faceplate further comprises an identification unit, communicatively coupled to said electronic device when said removable faceplate is attached to said electronic device, for identifying said faceplate to said electronic device.

12. A device as described in claim 9 wherein said removable faceplate further comprises an auxiliary power supply coupled to supply power to said electronic device when said removable faceplate is attached to said electronic device.

* * * * *